US008325251B2

(12) United States Patent
Takachi

(10) Patent No.: US 8,325,251 B2
(45) Date of Patent: Dec. 4, 2012

(54) IMAGING APPARATUS, FUNCTION CONTROL METHOD, AND FUNCTION CONTROL PROGRAM

(75) Inventor: Tomoko Takachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 682 days.

(21) Appl. No.: 12/329,764

(22) Filed: Dec. 8, 2008

(65) Prior Publication Data

US 2009/0185047 A1 Jul. 23, 2009

(30) Foreign Application Priority Data

Dec. 28, 2007 (JP) ................................ P2007-338955

(51) Int. Cl.
*H04N 5/262* (2006.01)
*G03B 17/00* (2006.01)
*G03B 13/10* (2006.01)

(52) U.S. Cl. .................. 348/240.99; 348/240.3; 396/76; 396/379

(58) Field of Classification Search ............... 348/222.1, 348/208.11, 348; 396/89, 72, 529
See application file for complete search history.

(56) References Cited

U.S. PATENT DOCUMENTS

| 5,177,524 A * | 1/1993 | Tanaka ........................... 396/103 |
| 2005/0088547 A1 * | 4/2005 | Kazami ..................... 348/240.99 |
| 2005/0212950 A1 * | 9/2005 | Kanai ............................ 348/345 |
| 2006/0257142 A1 * | 11/2006 | Tanaka ........................... 396/529 |
| 2007/0086765 A1 * | 4/2007 | Nakamura ........................ 396/72 |
| 2007/0116451 A1 * | 5/2007 | Yamamoto et al. ............ 396/133 |
| 2007/0188466 A1 * | 8/2007 | Lee et al. ........................ 345/167 |
| 2011/0080497 A1 * | 4/2011 | Ejima et al. ................. 348/222.1 |
| 2011/0228136 A1 * | 9/2011 | Sugimoto ................ 348/231.99 |

FOREIGN PATENT DOCUMENTS

| JP | 5-81832 | 11/1993 |
| JP | 10-268374 | 10/1998 |
| JP | 2000-147368 | * 11/1998 |
| JP | 11-305115 | 11/1999 |
| JP | 2000-147368 | 5/2000 |
| JP | 2002-277726 | 9/2002 |
| JP | 2005-215666 | 8/2005 |
| JP | 2006-171107 | 6/2006 |
| JP | 2007-41097 | 2/2007 |

OTHER PUBLICATIONS

Japanese Office Action in corresponding Japanese Patent Application 2007-338955 dated Oct. 22, 2009 (2 pages).

* cited by examiner

*Primary Examiner* — Jason Chan
*Assistant Examiner* — Stephen Coleman
(74) *Attorney, Agent, or Firm* — Finnegan, Henderson, Farabow, Garret & Dunner, L.L.P.

(57) ABSTRACT

An imaging apparatus includes: receiving means for receiving selection input for an imaging mode; discriminating means for discriminating, when the selection input is received through the receiving means, a selected imaging mode on the basis of the received selection input; and scanning controlling means for causing, when it is discriminated by the discriminating means that a simple imaging mode for limiting operation input and allowing a user to appropriately take an image of a subject is selected, the imaging apparatus to execute scanning processing for specifying a position of the subject, which is performed to set focus on the subject, in a maximum range from a near scene to a distant scene.

15 Claims, 7 Drawing Sheets

FIG. 2

IMAGING MODE OVERVIEW

- NORMAL IMAGING MODE

USER SELECTION

- AUTOMATIC FOCUS ADJUSTING FUNCTION
    - NORMAL AREA (50 cm → ∞)
    - MACRO (SEVERAL CENTIMETERS → 50 cm)
    - AUTO MACRO (SEVERAL CENTIMETERS → ∞)
  - EXPOSURE FIXED MODE
  - WHITE BALANCE FIXED MODE
  - SHUTTER SPEED FIXED MODE
  - OTHER VARIOUS KINDS OF SELECTION AND SETTING ARE POSSIBLE

- SIMPLE IMAGING MODE

- AUTOMATIC FOCUS ADJUSTING FUNCTION
    - FIXED IN AUTO MACRO
  - AUTOMATIC EXPOSURE ADJUSTING FUNCTION
  - AUTOMATIC WHITE BALANCE ADJUSTING FUNCTION

USER SELECTION

- IMAGE SIZE (LARGE/SMALL)  FLASH (AUTOMATIC/PROHIBITED)  SELF-TIMER (ON/OFF)

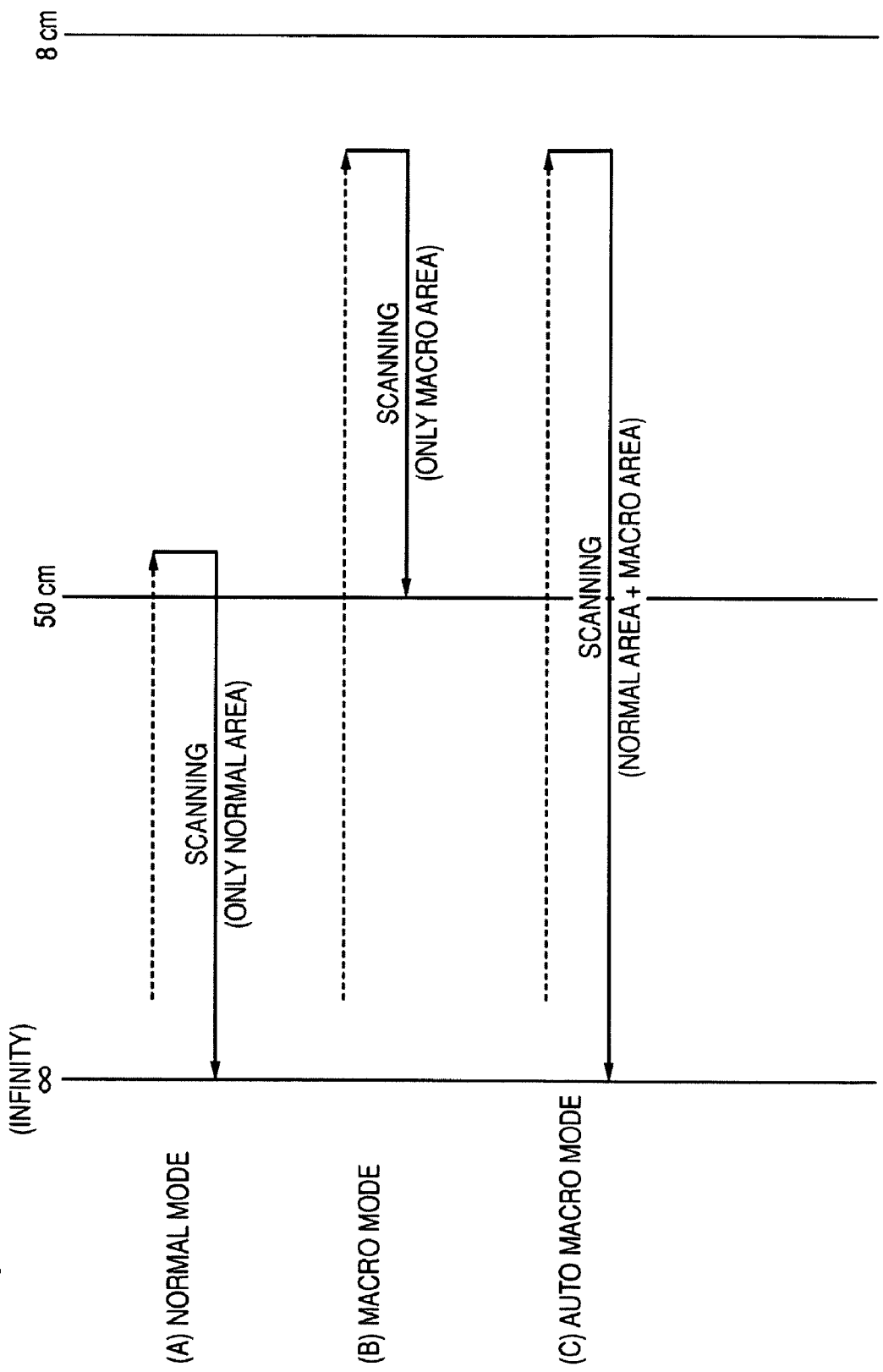

IMAGING APPARATUS, FUNCTION CONTROL METHOD, AND FUNCTION CONTROL PROGRAM

CROSS-REFERENCES TO RELATED APPLICATIONS

The present invention contains subject matter related to Japanese Patent Application JP 2007-338955 filed in the Japanese Patent Office on Dec. 28, 2007, the entire contents of which being incorporated herein by reference.

BACKGROUND OF THE INVENTION

1. Field of the Invention

The present invention relates to various imaging apparatuses such as a digital still camera, a digital video camera, and a camera module mounted on a cellular phone terminal and the like and a method and a program for function control corresponding to imaging modes used in the imaging apparatuses.

2. Description of the Related Art

Various digital cameras such as a stand-alone digital camera and a camera module mounted on a cellular phone terminal are widely used. In the digital cameras widely used in this way, various automatic control functions such as an automatic exposure adjusting function called AE (Automatic Exposure), an automatic white balance adjusting function called AWB (Automatic White Balance), and an automatic focus adjusting function called AF (Automatic Focus) are realized.

A user can take, by using the various automatic control functions, images of a target subject with appropriate exposure and appropriate white balance and in an appropriately focused state without applying complicated adjustment operation to the user's own digital camera.

In the AF function, in order to automatically detect a position of the subject (a distance from the digital camera to the subject), the digital camera performs so-called scanning for specifying the position of the subject while gradually changing a focus. As one of specific methods for the scanning, there is a method of capturing images while gradually changing focus in a predetermined distance range, performing frequency analysis of the captured images, and setting a position where a largest number of high-frequency components are present as a position where the digital camera is focused (a focused position). The position where there are a largest number of high-frequency components is set as the focused position because, if the digital camera is focused, a contour of the subject is made clear and the number of high-frequency components increases.

When the user uses the digital camera to take images, usually, the user often shoots a person in a position one meter to several meters apart from the digital camera, a scene several tens meters to several hundreds meters apart from the digital camera, and the like. Therefore, in the AF function of the digital camera, an area from a position about one meter apart from the digital camera to the infinity is set as a normal area. The scanning is often performed in this area (range).

However, if the scanning is performed in only the normal area, for example, when the user desires to take a picture of a flower in bloom from a position as close as possible to the flower (e.g., from a position about several tens centimeters from the flower), the digital camera is not focused by the AF function. Therefore, when the user attempts to take an image of the subject from a near distance equal to or smaller than several tens centimeters from the subject, the user can focus the camera on the subject in a near scene using a so-called macro mode for setting a scanning range in a range equal to or smaller than several tens centimeters from the digital camera.

Therefore, when the user takes an image of the subject only several tens centimeters apart from the subject, the user needs to perform operation for switching a normal mode for scanning the normal area to the macro mode for setting a scanning range in a range equal to or smaller than several tens centimeters from the digital camera. Since digital cameras in these days are improved in operability, the user is allowed to relatively easily perform the switching (change) between the normal mode and the macro mode by operating the digital camera according to guidance.

Nevertheless, a user unaccustomed to the digital camera (including a user not having knowledge concerning focus) may be unable to easily perform switching between the normal mode and the macro mode of the AF function. As a result, it sometimes occurs that, although the user takes a picture of a flower in bloom in a position as close as possible to the flower, the digital camera is not focused on the flower and only a so-called blurred picture is taken.

In order to solve such a problem, JP-A-2007-249068 discloses a technique for automatically switching, when the AF function is performed in the normal mode, the normal mode to the macro mode if the digital camera scans the normal area (e.g., a range from a position about one meter apart from the digital camera to the infinity) and is not focused and performing the scanning with the scanning range set in a range equal to or smaller than several tens centimeters from the digital camera to thereby allow the user to appropriately take an image of a subject even in a near position.

When the technique disclosed in JP-A-2007-249068 is used, the user does not need to switch the normal mode and the macro mode of the AF function every time the user performs shooting. Therefore, it is possible to prevent failure in the case of near distance shooting.

SUMMARY OF THE INVENTION

With the technique disclosed in JP-A-2007-249068, it is possible to effectively prevent the user from performing taking an image while the digital camera is not focused. However, the user may have to perform other various kinds of setting. For a user unaccustomed to the digital camera (including a user not having knowledge concerning focus), operability of the digital camera is not substantially improved. When, for example, a user accustomed to the operation of the digital camera (a user having knowledge concerning focus) continuously performs near distance shooting, the user may wish to switch the normal mode to the macro mode to perform shooting.

When the user accustomed to the operation of the digital camera and the user unaccustomed to the operation of the digital camera share one digital camera, for example, when family members share one digital camera, it is desirable to use the digital camera in states most convenient for the respective users. For the user unaccustomed to the operation of the digital camera, it is important not only to improve operability but also to be capable of surely taking images, without fail, of scenes ranging from a near scene to a distant scene without being particularly careful to do so.

Therefore, it is advantageous to allow a user to use an imaging apparatus in a most convenient state and allow even a user unaccustomed to the operation of the imaging apparatus to take images of scenes ranging from a near scene to a distant scene without fail.

According to an embodiment of the prevent invention, there is provided an imaging apparatus including: receiving means for receiving selection input for an imaging mode; discriminating means for discriminating, when the selection input is received through the receiving means, a selected imaging mode on the basis of the received selection input; and scanning controlling means for causing, when it is discriminated by the discriminating means that a simple imaging mode for allowing a user to appropriately take an image of a subject with user operation input minimized is selected, the imaging apparatus to execute scanning processing for specifying a position of the subject in a maximum range from a near scene to a distant scene in order to set the focus on the subject.

With the imaging apparatus according to the embodiment, when selection input from the user is received through the receiving means, an imaging mode selected by the user is discriminated by the discriminating means on the basis of the received selection input. When it is discriminated by the discriminating means that the imaging mode selected by the user is the simple imaging mode, the imaging apparatus is forced by the scanning controlling means to execute the scanning processing for specifying a position of the subject in a maximum range from a near scene to a distant scene.

Consequently, the imaging apparatus can be caused to provide the simple imaging mode for a user unaccustomed to the operation of the imaging apparatus (including a user not having knowledge concerning focus). During the simple imaging mode, the imaging apparatus can be forced to set a maximum range of scanning as scanning object. Therefore, even the user unaccustomed to the operation of the imaging apparatus is allowed to take images of scenes ranging from a near scene to a distant scene without fail.

According to another embodiment of the invention, the imaging apparatus further includes display controlling means for limiting, when it is discriminated by the discriminating means that the simple imaging mode is selected, display information to be displayed on a display device provided in the imaging apparatus and controlling a display form of the display information.

With the imaging apparatus of this embodiment, when it is discriminated by the discriminating means that the imaging mode selected by the user is the simple imaging mode, a display form of display information to be displayed on the display device of the imaging apparatus is controlled by the display controlling means. For example, display control for, for example, limiting the display information to necessary display information and displaying the necessary display information in a size larger than usual is performed.

Consequently, even the user unaccustomed to the operation of the imaging apparatus is allowed to surely look at only the necessary information. An imaging apparatus convenient even for the user unaccustomed to the operation of the imaging apparatus is realized.

According to still another embodiment of the invention, the imaging apparatus further includes operation controlling means for performing, when it is discriminated by the discriminating means that the simple imaging mode is selected, control to limit operable operation keys of the operation-input receiving means that receives operation input from the user.

With the imaging apparatus of this embodiment, when it is discriminated by the discriminating means that the imaging mode selected by the user is the simple imaging mode, operable operation keys of the operation-input receiving means of the imaging apparatus are limited by the operation controlling means. In other words, for example, only necessary minimum operation keys are allowed to function.

Consequently, inconvenience in that, for example, the user carelessly performs unnecessary operation or performs wrong operation is prevented. An imaging apparatus convenient even for the user unaccustomed to the operation of the imaging apparatus is realized.

According to the embodiments of the present invention, it is possible to allow a user to use the imaging apparatus in a state most convenient for the user. It is possible to allow even a user unaccustomed to the operation of the imaging apparatus (including a user not having knowledge concerning focus) to take images of scenes ranging from a near scene to a distant scene without fail.

BRIEF DESCRIPTION OF THE DRAWINGS

FIG. 2 is a diagram for explaining an overview of a normal imaging mode and a simple imaging mode;

FIG. 3 is a diagram for explaining modes of scanning and ranges of the scanning in an automatic focus adjusting function;

DESCRIPTION OF THE PREFERRED EMBODIMENTS

Embodiments of the present invention are explained below with reference to the accompanying drawings. In the embodiments explained below, the present invention is applied to a digital still camera (hereinafter simply referred to imaging apparatus).

CONFIGURATION EXAMPLE OF THE IMAGING APPARATUS

Figure 1:
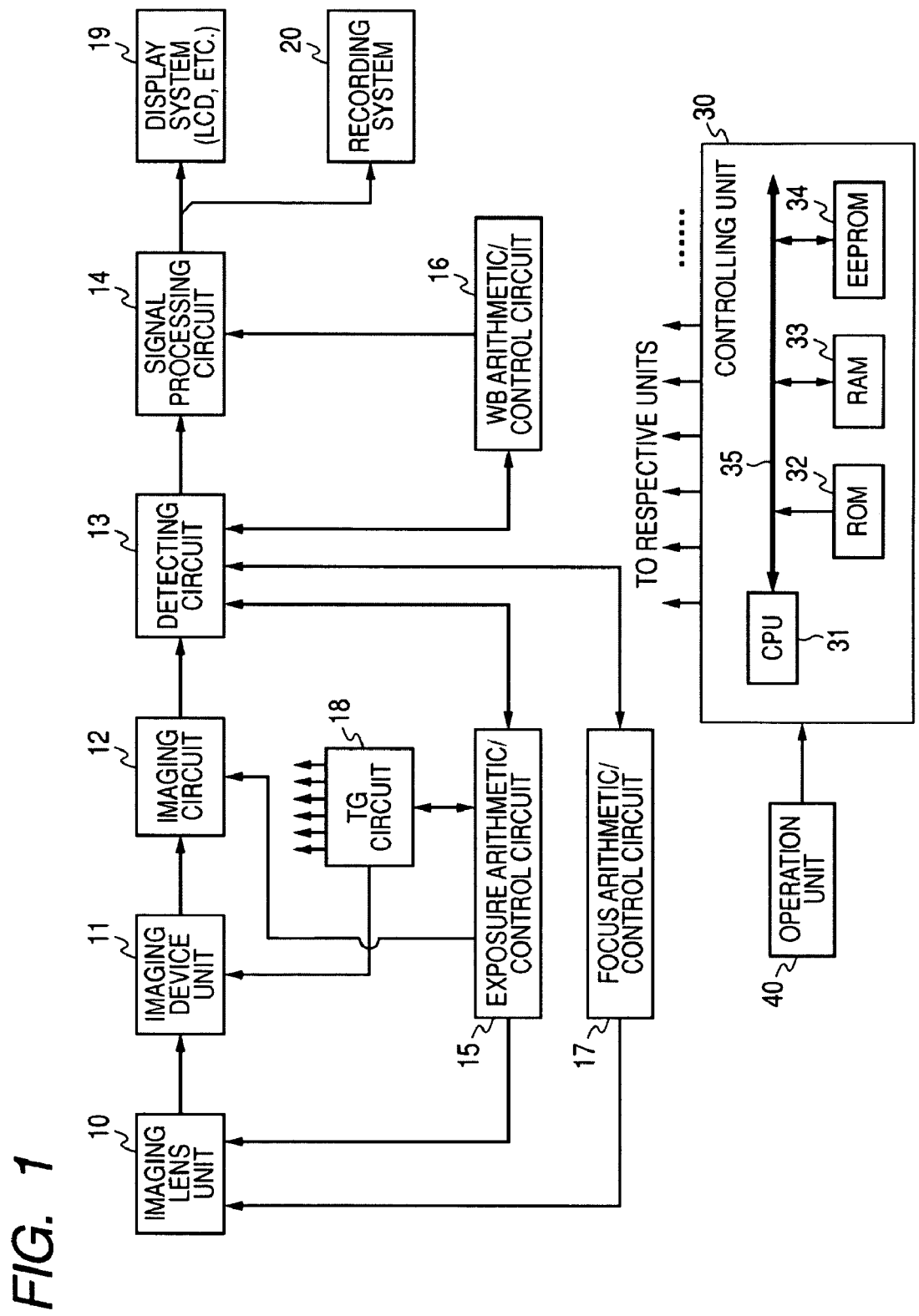
FIG. 1 is a block diagram for explaining a configuration example of an imaging apparatus according to an embodiment of the present invention.

FIG. 1 is a block diagram for explaining a configuration example of an imaging apparatus according to this embodiment. As shown in FIG. 1, the imaging apparatus according to this embodiment includes an imaging lens unit 10, an imaging device unit 11, an imaging circuit 12, a detecting circuit 13, a signal processing circuit 14, an exposure arithmetic/control circuit 15, a WB (White Balance) arithmetic/control circuit 16, a focus arithmetic/control circuit 17, a TG (Timing Generator) circuit 18, a display system 19, a recording system 20, a controlling unit 30, and an operation unit 40.

The display system 19 is a unit including a display device and a control circuit for the display device. As the display device included in the display system 19, various display devices such as an LCD (Liquid Crystal Display), an organic EL panel (Organic Electroluminescence Panel), and a CRT (Cathode Ray Tube) can be used. In the explanation of this embodiment, it is assumed that the LCD is used.

The recording system 20 is a unit including a recording media driver and a control circuit for the recording media driver. The recording system 20 can use various recording media such as a magnetic tape, an optical disk such as a DVD (Digital Versatile Disc), a hard disk, and a semiconductor memory such as a flash memory. It is assumed that, in the imaging apparatus according to this embodiment, for example, a so-called card memory in which a semiconductor memory is used can be detachably insertable in the recording system 20.

An overall configuration of the imaging apparatus according to this embodiment is explained with reference to FIG. 1. The imaging lens unit 10 is a unit that includes an imaging lens (an object lens), an exposure adjusting mechanism, and a focus adjusting mechanism and focuses an image of a subject on a sensor surface of an imaging device. The imaging device unit 11 includes an imaging sensor such as a CCD (Charge Coupled Device) or CMOS (Complementary Metal Oxide Semiconductor) image sensor. The imaging device unit 11 captures an image, which is focused on a sensor surface thereof, as an electric signal and supplies the electric signal to the imaging circuit 12 at a post stage.

Although not shown in the figure, the imaging circuit 12 includes a CDS (Correlated Double Sampling) circuit, an AGC (Automatic Gain Control) circuit, and an A/D (Analog/Digital) converter. The imaging circuit 12 captures an imaging signal from the imaging device unit 11 as digital data. An output signal (digital imaging data) from the imaging circuit 12 is supplied to the signal processing circuit 14 through the detecting circuit 13.

The detecting circuit 13 sets, for the imaging data captured through the imaging lens unit 10, the imaging device unit 11, and the imaging circuit 12, a detection area including plural divided areas in a predetermined image area. The detecting circuit 13 calculates, for each of the exposure arithmetic/control circuit 15, the WB arithmetic/control circuit 16, and the focus arithmetic/control circuit 17 at a post stage, an evaluation value (a detection value) concerning processing-object imaging data used for control by the circuit from the imaging data in the respective divided area of the detection area. The detecting circuit 13 supplies the evaluation value to the target circuit.

The TG circuit 18 forms various timing signals such as driving timing signals to be supplied to the units such as the imaging device unit 11, the AE arithmetic/control circuit 15, the AWB arithmetic/control circuit 16, and the AF arithmetic/control circuit 17 and supplies the timing signals to the units that need the timing signals.

The exposure arithmetic/control circuit 15 controls automatic exposure adjustment and exposure adjustment by user setting. For example, when the automatic exposure adjustment is performed, the exposure arithmetic/control circuit 15 generates, in synchronization with the timing signal from the TG circuit 18, a signal for controlling a lens aperture value of the imaging lens unit 10 such that proper brightness and a proper exposure amount are obtained when image recording is performed in the recording system 20 and supplies the signal to the imaging lens unit 10, generates a signal for controlling an electronic shutter speed and supplies it to the TG circuit 18 such that, after the signal is adjusted in the TG circuit 18, the signal is supplied to the imaging device unit 11. The exposure arithmetic/control circuit 15 performs control of detecting operations for sections related to gain control by the AGC circuit in the imaging circuit 12 and exposure control by the detecting circuit 13 as well. Therefore, the exposure arithmetic/control circuit 15 forms control signals to be supplied to the imaging circuit 12 and the detecting circuit 13 and supplies the control signals thereto.

The WB arithmetic/control circuit 16 controls automatic white balance adjustment and white balance adjustment by user setting. For example, when the automatic white balance adjustment is performed, the WB arithmetic/control circuit 16 forms, in synchronization with the timing signal from the TG circuit 18, control signals for controlling an R (red) signal gain and a B (blue) signal gain of the signal processing circuit 14 such that proper white balance is obtained when image recording is performed in the recording system 20 and supplies the control signals to the signal processing circuit 14. The WB arithmetic/control circuit 16 performs control of detecting operations for sections related to the automatic white balance control by the detecting circuit 13 as well. Therefore, the WB arithmetic/control circuit 16 forms a control signal to be supplied to the detecting circuit 13 and supplies the control signal to the detecting circuit 13.

The focus arithmetic/control circuit 17 controls automatic focusing adjustment (automatic focus adjustment) and control focusing by user operation. For example, when the automatic focusing (AF) is performed, the focus arithmetic/control circuit 17 forms, in synchronization with the timing signal from the TG circuit 18, a control signal for controlling the focus of the imaging lens unit 10 such that the imaging lens unit 10 is properly focused when image recording is performed in the recording system 20 and supplies the control signal to the imaging lens unit 10. The focus arithmetic/control circuit 17 performs control of detecting operations for sections related to the AF control by the detecting circuit 13 as well. Therefore, the focus arithmetic/control circuit 17 forms a control signal to be supplied to the detecting circuit 13 and supplies the control signal thereto.

As explained above, the exposure arithmetic/control circuit 15, the WB arithmetic/control circuit 16, and the focus arithmetic/control circuit 17 respectively form the exposure control signal, the WB control signal, and the focus control signal on the basis of detection values as evaluation values for the circuits from the detection circuit 13 and supply the control signals to target circuit sections. This makes it possible to appropriately control exposure, white balance, and focusing, appropriately take an image of a subject, and obtain imaging data of the image.

The signal processing circuit 14 applies, on the basis of the control signal from the WB arithmetic/control circuit 16, processing such as WB adjustment (white balance adjustment) to imaging data supplied from the imaging circuit 12 through the detecting circuit 13. The signal processing circuit 14 forms a luminance signal Y and color signals Cr and Cb as image data for output and supplies the signals to the display system 19 and the recording system 20.

In the signal processing circuit 14, various kinds of correction processing such as pixel defect correction, flicker correction, noise reduction, shading correction, chromatic aberration correction, and gamma correction are also applied to the imaging data.

As explained above, the display system 19 includes, for example, the LCD as the display device and includes the control circuit for the LCD as well. The display system 19 forms an image signal for display for displaying an image on the LCD from the image data from the image processing circuit 14. The display system 19 supplies the image signal to the LCD to thereby display an image corresponding to the image data from the signal processing circuit 14 on a display screen of the LCD.

As explained above, the recording system 20 includes the media driver in which a so-called card memory can be detachably insertable as a recording medium. The recording system 20 can record digital imaging data from the signal processing circuit 14 in a semiconductor memory incorporated in the card memory inserted in the recording system 20.

In this embodiment, for simplification of explanation, explanation about a reproduction system is omitted. However, it is also possible to read out the imaging data recorded in the card memory by the function of the recording system 20, supply the imaging data to the display system 19 and reproduce the imaging data, and output the imaging data to a display device and a recording and reproducing device on the outside.

The controlling unit 30 controls the respective units of the imaging apparatus according to this embodiment. As shown in FIG. 1, the controlling unit 30 is a microcomputer configured by connecting a CPU (Central Processing Unit) 31, a ROM (Read Only Memory) 32, a RAM (Random Access Memory) 33, and an EEPROM (Electrically Erasable and Programmable ROM) 34 through a CPU bus 35.

The CPU 31 functions as a control entity that reads out programs stored in the ROM 32 and the like and executes the programs, forms control signals to be supplied to the units and supplies the control signals to the units, and receives signals from the units and processes the signals. As explained above, in the ROM 32, programs to be executed by the CPU 31, various data necessary for processing, and the like are recorded in advance.

The RAM 33 is used as a so-called work area for, for example, temporarily storing interim results of various kinds of processing. The EEPROM 34 is a so-called nonvolatile memory. The EEPROM 34 stores various kinds of information that should be held even if a power supply for the imaging apparatus according to this embodiment is turned off such as various setting parameters and a program provided anew for adding a function.

In the operation unit 40, various operation keys and the like provided in various places of a housing of the imaging apparatuses according to this embodiment are provided. The operation keys include an on/off key for the power supply, a shutter key, a zoom adjusting key, a mode switching key, switching keys and setting keys for various functions, a menu key for switching display and non-display of menus on the display device of the display system 19, an up arrow key, a down arrow key, a left arrow key, and a right arrow key used for, for example, selecting a menu item and inputting setting information, and an enter key. The operation unit 40 can receive operation input from the user, convert the operation input into an electric signal, and supply the electric signal to the controlling unit 30.

Consequently, the controlling unit 30 can perform, by controlling the units according to operation input received through the operation unit 40, various kinds of processing for, for example, recording an image of a subject obtained by performing imaging in the card memory inserted in the recording media drive of the recording system 20 and reading out image data recorded in the card memory inserted in the recording media drive of the recording system 20 from the card memory and outputting the image data.

Operations (Processing) During Imaging

Operations during imaging in the imaging apparatus according to this embodiment shown in FIG. 1 are explained below. When the power supply is turned on through the operation unit 40, the controlling unit 30 controls the units to be set in an imaging state and waits for the shutter key to be depressed.

A primary color filter (not shown) is attached on a front surface of the imaging device such as a CCD of the imaging device unit 11. In a state in which the power supply is on, an optical image of a subject is made incident on an imaging surface of the imaging device through the imaging lens unit 10 and the primary color filter. The primary color filter is an optical filter in which red, green, and blue filter sections are arrayed in mosaic. A complementary color optical filter in which yellow, cyan, magenta, and green filter sections are arrayed in mosaic may be used instead of the primary color filter.

The imaging device of the imaging device unit 11 photo-electrically converts the optical image of the subject made incident through the imaging lens unit 10 and generates an imaging signal (charges). The generated imaging signal is read and outputted in a raster scan system. The outputted imaging signal is supplied to the imaging circuit 12 and, after being subjected to noise reduction by the CDS circuit and gain, adjustment by the AGC circuit, supplied to the A/D converter. The imaging signal in an analog form is converted into a digital imaging signal (digital imaging data) and outputted.

The signal processing circuit 14 applies signal processing such as gamma processing, color separation processing, and YUV conversion at a ratio of 4:2:2 to the imaging signal (the digital imaging data) supplied from the imaging circuit 12 via the detecting circuit 13 and creates image data including luminance signal data and chroma signal data.

The image data is supplied from the signal processing circuit 14 to the display system 19 and the recording system 20. In the display system 19, an image is displayed on the display screen of the LCD included in the display system 19 according to the image data supplied from the signal processing circuit 14. When the user checks the image displayed on the display screen of the LCD included in the display system 19 and depresses the shutter key, the image data captured as explained above is supplied to the recording system 20. In the recording system 20, image data for recording is formed from the supplied image data. The image data for recording is recorded in the card memory inserted in the recording medium driver.

In the imaging apparatus according to this embodiment, in the state in which the power supply is on, exposure and shutter speed are adjusted automatically or according to user instruction input by the function of the exposure arithmetic/control circuit 15. White balance is adjusted automatically or according to user instruction input by the function of the WB arithmetic/control circuit 16. Focus is adjusted automatically or according to user instruction input by the function of the focus arithmetic/control circuit 17.

Imaging Mode

The imaging apparatus according to this embodiment has a normal imaging mode and a simple imaging mode. The normal imaging mode is a mode set by assuming general users accustomed to operation of electronic devices to a certain extent. In the normal imaging mode, it is possible to perform switching of various modes, setting of various kinds of information, and the like to perform imaging in an intended manner. The simple imaging mode is a mode set by assuming users unaccustomed to operation of electronic devices (including users not having knowledge concerning focus, etc.). The simple imaging mode makes it possible to appropriately take an image of a subject even under any imaging condition with mode switching operation and information setting operation limited to necessary minimum operation.

FIG. 2 is a diagram for explaining overviews of the normal imaging mode and the simple imaging mode. First, an overview of the normal imaging mode is explained. In the normal imaging mode, a relatively large number of items selectable by the user are prepared.

As shown in FIG. 2, in the normal imaging mode, with the automatic focus adjusting function (the AF function), in order to automatically focus the imaging apparatus, it is possible to select a normal mode for scanning a normal area, a macro mode for scanning a macro area, and an auto macro mode for scanning an area including the normal area and the macro area as scanning ranges for specifying a position of a subject (a distance from the imaging apparatus to the subject).

FIG. 3 is a diagram for explaining modes of scanning and a range of the scanning in the automatic focus adjusting function of the imaging apparatus according to this embodiment. The imaging apparatus according to this embodiment has, as scanning modes in the automatic focus adjusting function, the normal mode for setting an area (a range) from a position about 50 centimeters apart from the imaging apparatus to the infinity as a normal area and scanning the normal area as shown in (A) of FIG. 3, the macro mode for setting an area (a range) from a position about 8 centimeters apart from the imaging apparatus to the position about 50 centimeters apart from the imaging apparatus as a macro area and scanning the macro area as shown in (B) of FIG. 3, and the auto macro mode for scanning a maximum area (a maximum range) including the macro area and the normal area as shown in (C) of FIG. 3.

In the normal imaging mode, as explained above, the user can select which of the normal mode, the macro mode, and the auto macro mode prepared as the scanning modes should be used.

In the imaging apparatus according to this embodiment, in a state in which the normal imaging mode is selected, usually, each of the automatic focus adjusting function (the AF function), the automatic exposure adjusting function (the AE function), and the automatic white balance adjusting function (the AWB function) operates. The user can take an image of the subject with focus, exposure, and white balance automatically adjusted.

However, in the normal imaging mode, it is also possible to select and use various modes such as an exposure fixed mode in which the imaging apparatus can perform imaging while keeping exposure at a fixed value selected by the user, a white balance fixed mode in which the imaging apparatus can perform imaging while keeping white balance at a fixed value selected by the user, and a shutter speed fixed mode in which the imaging apparatus can perform imaging while keeping shutter speed at a fixed value selected by the user.

In the normal imaging mode, besides the selection of the various usable modes explained above, it is possible to select and set various parameters and the like. Therefore, in the normal imaging mode, it is possible to image the subject under a condition matching a purpose of imaging while freely switching, according to the purpose, the selection of the usable mode, the parameters that can be selected and set, and the like as explained above.

On the other hand, in the imaging apparatus according to this embodiment, in the simple imaging mode, as shown in FIG. 2, the automatic focus adjusting function, the automatic exposure adjusting function, and the automatic white balance adjusting function are used. In the automatic focus adjusting function, the scanning area is forcibly fixed in the auto macro area shown in (C) of FIG. 3. In other words, the mode of the imaging apparatus is fixed in the auto macro mode.

In the simple imaging mode, as items selectable by the user, it is possible to set only three items, selection of an image size, selection of "automatic" and "prohibited" of flash, and selection of on and off of a self-timer.

In the imaging apparatus according to this embodiment, as image sizes, it is possible to select any one of two kinds of the size of an image to be taken and recorded, i.e., large (8 megabytes) and small (one megabyte). Concerning the flash, it is possible to select "automatic" for automatically sensing the brightness of the surroundings and automatically controlling whether the flash should be used and "prohibited" for controlling not to use the flash at all. Concerning the self-timer, it is possible to select whether the self-timer should be used (turned on or off).

In the simple imaging mode, the items that can be selected and set are limited as explained above. Therefore, operation not intended by the user is prevented from being performed. Further, information more detailed than necessary is prevented from being supplied to the user to confuse the user. In other words, in the simple imaging mode, functions that take into account operability and displayability of information are provided.

Figure 4:
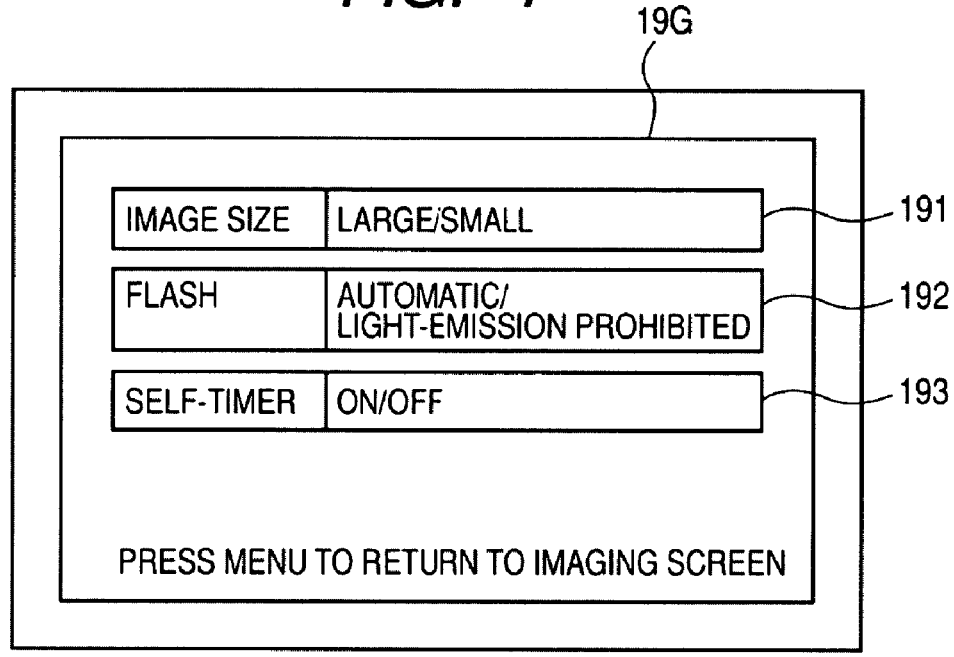
FIG. 4 is a diagram for explaining functions that mainly take into account operability during the simple imaging mode.
Figure 5:
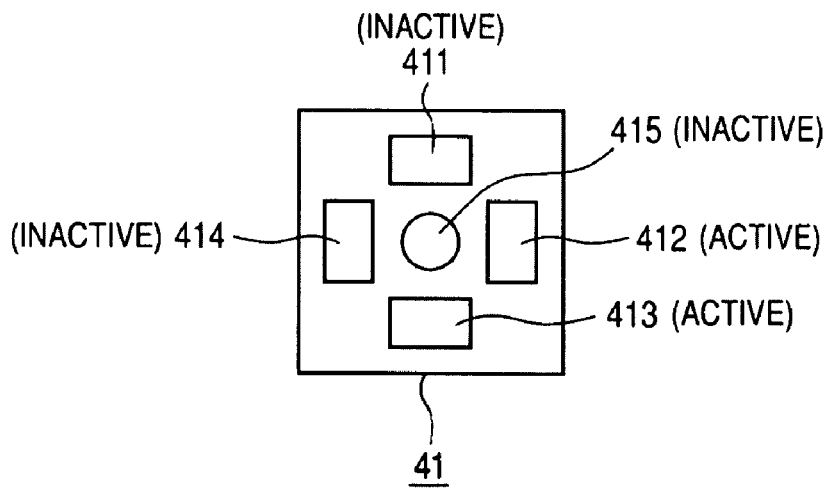
FIG. 5 is a diagram for explaining the functions that mainly take into account operability during the simple imaging mode.

First, functions that mainly take into account operability in the simple imaging mode are explained. FIGS. 4 and 5 are diagrams for explaining functions that mainly take into account operability in the simple imaging mode. As explained above, in the simple imaging mode, the items selectable by the user are only the three items, the selection of the image size, the selection of "automatic" and "prohibited" of the flash, and the selection of on and off of the self-timer.

Therefore, when the user depresses the menu key provided in the imaging apparatus, as shown in FIG. 4, only menus of only the three items explained above that can be actually selected and set are displayed on a display screen 19G of the display system 19. Specifically, in the simple imaging mode, as shown in FIG. 4, only the selection concerning the three items, selection of large and small of the image size, selection of "automatic" and "light-emission prohibited" of the flash, and selection of on and off of the self-timer can be performed.

In actual selection operation, the user can select any one of the image size, the flash, and the self-timer using up and down arrow keys provided in the operation unit 40 and select selection content of the selected item using left and right arrow keys. Besides, it is also possible to stick a touch panel to the display screen of the display system 19, detect a position touched by a finger of the user, and process content displayed in a position on the display screen 19 corresponding to the touched position as selected content.

When the menu key is depressed again in the state shown in FIG. 4, the display screen is reset to the imaging screen. An image of the subject focused on the imaging surface of the imaging device of the imaging device unit 11 through the imaging lens unit 10 is displayed on the display screen of the display system 19. When the user depresses the shutter, the image captured at that point is recorded in the recording medium (in this embodiment, the card memory) of the recording system 20.

In this way, the imaging apparatus according to this embodiment can notify the user of operable items with simple and plain words and simply notify the user of contents that can be selected and set. As a character font in use, a larger character font is used. Display itself is adapted to be easily seen.

In the operation unit 40 of the imaging apparatus according to this embodiment, a simple switching key unit 41 that allows the user to switch frequently used modes and functions with simple operation is provided. In the simple imaging mode, operable switching keys of the simple switching key unit 41 are limited.

FIG. 5 is a diagram for explaining a configuration example of the simple switching key unit 41 provided in the imaging apparatus according to this embodiment. As shown in FIG. 5, the simple switching key unit 41 of this example includes a Disp key 411, a flash key 412, a self-timer key 413, a macro switching key 414, and a determination key 415.

The Disp key 411 switches display and non-display of selectable plural icons in the normal imaging mode. Specifically, the Disp key 411 can switch display and non-display of icons such as a brightness (EV value) icon, a sensitivity (ISO value) icon, an imaging frame on/off icon, and an on/off icon for backlight correction. In other words, in the normal imaging mode, the user can display the icons and perform various kinds of setting when necessary and switch the icons to non-display when the icons are unnecessary by depressing the Disp icon 411.

The flash key 412 allows the user to select "automatic" for automatically sensing the brightness of the surroundings and automatically controlling whether the flash should be used and "prohibited" for controlling not to use the flash at all. The self-timer key 413 allows the user to select whether the self-timer should be used.

The macro switching key 414 is a switching key for a scanning area for detecting a position of the subject. The macro switching key 414 allows the user to switch, every time the user depresses the macro switching key 414, the normal mode for scanning the normal area, the macro mode for scanning the macro area, and the auto macro mode for scanning the normal area and the macro area.

The determination key 415 is a key for allowing the user to determine content selected or set using the Disp key 411, the flash key 412, the self-timer key 413, or the macro switching key 414 and use the content for various kinds of processing and control in the imaging apparatus according to this embodiment.

In the imaging apparatus according to this embodiment, in the simple imaging mode, only operation applied to the two operation keys, the flash key 412 and the self-timer key 413, in the simple switching key unit 41 is activated. Operation applied to the three operation keys, the Disp key 411, the macro key 414, and the determination key 415, is inactivated.

In this way, in the simple imaging mode, the simple switching key unit 41 can be used as so-called shortcut. Only operation applied to operable operation keys is activated to prevent unusable operation keys from being operated to display an error message and cause inconvenience in that, for example, a user unaccustomed to operation is confused.

Figure 6:
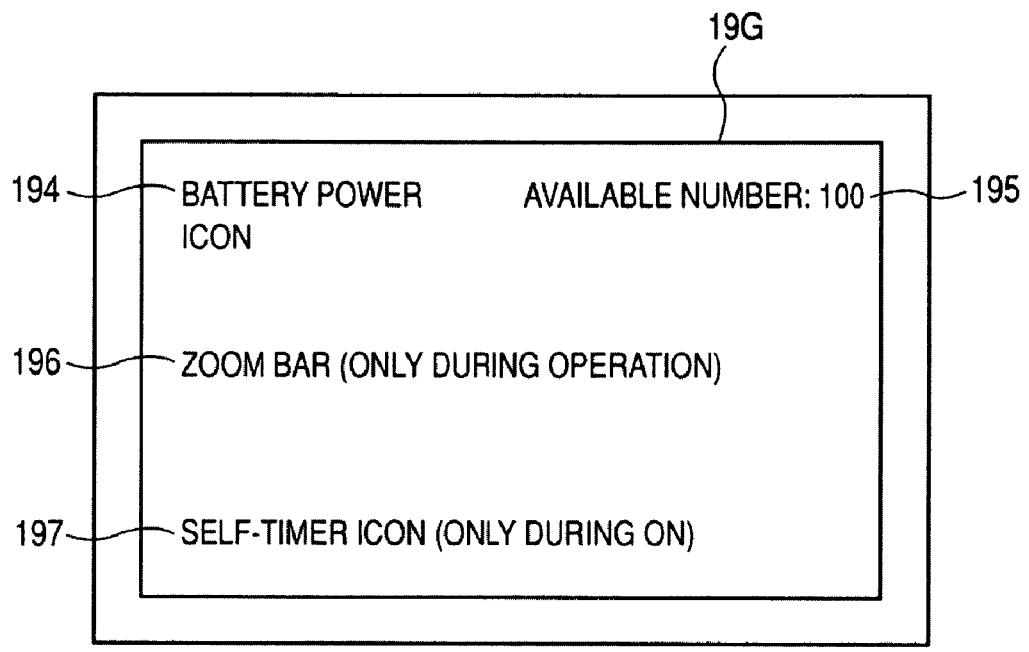
FIG. 6 is a diagram for explaining functions that mainly take into account displayability of information during the simple imaging mode.
Figure 7:
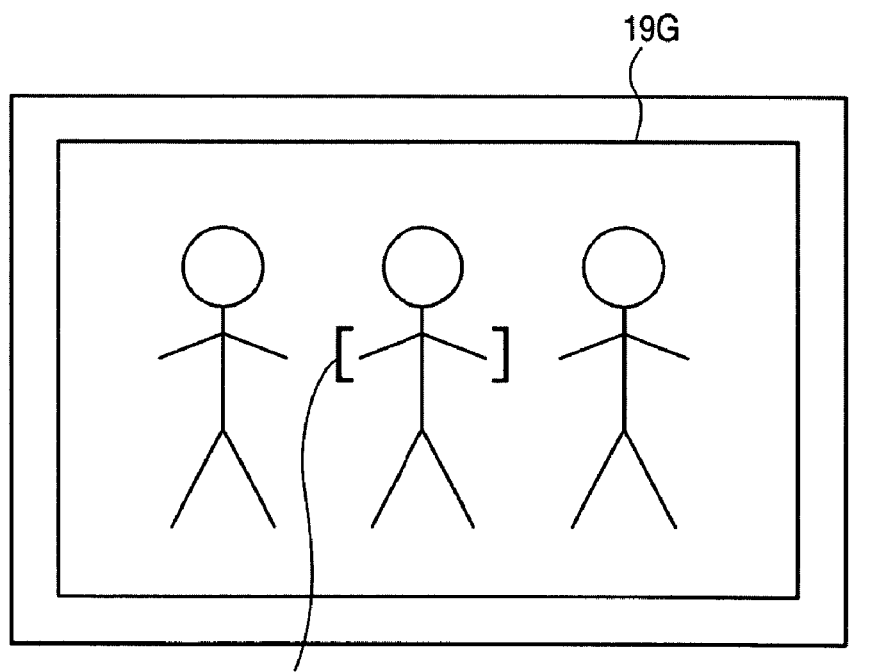
FIG. 7 is a diagram for explaining the functions that mainly take into account displayability of information during the simple imaging mode.

Functions that mainly take into account displayability of information in the simple imaging mode are explained. FIGS. 6 and 7 are diagrams for explaining the functions that mainly take into account displayability of information in the simple imaging mode.

In the imaging apparatus according to this embodiment, in the simple imaging mode, two icons, a battery power icon 194 indicating battery power and an available number indicator 195 that indicates the number of imageable pictures, are basically displayed in a large font on the display screen 19G of the display system 19. When a zoom operation key provided in the operation unit 40 is operated, a zoom bar indicator 196 indicating a degree of zoom is displayed. When the self-timer is turned on, a self-timer icon 197 is displayed.

In this way, in the imaging apparatus according to this embodiment, in the simple imaging mode, only four kinds of display considered to be necessary minimum display are performed. Therefore, it is possible to prevent inconvenience in that a user unaccustomed to the operation of the imaging apparatus is confused because complicated display is performed.

FIG. 7 is a diagram of a display example of a focus mark 198 displayed in the normal imaging mode. In the normal imaging mode, the focus mark 198 indicating where the focus is set. However, the user not accustomed to the imaging apparatus may not be able to understand what such display means. The display may only cause the user to feel uneasiness. Therefore, in the simple imaging mode, the focus mark 198 shown in FIG. 7 is not displayed either.

As explained above, in the imaging apparatus according to this embodiment, in the simple imaging mode, in order to perform display easy to see for the user unaccustomed to the imaging apparatus, only necessary minimum information is displayed in the large font on the display screen 19G of the display system 19 of the imaging apparatus.

Functions of the Controlling Unit 30

Figure 8:
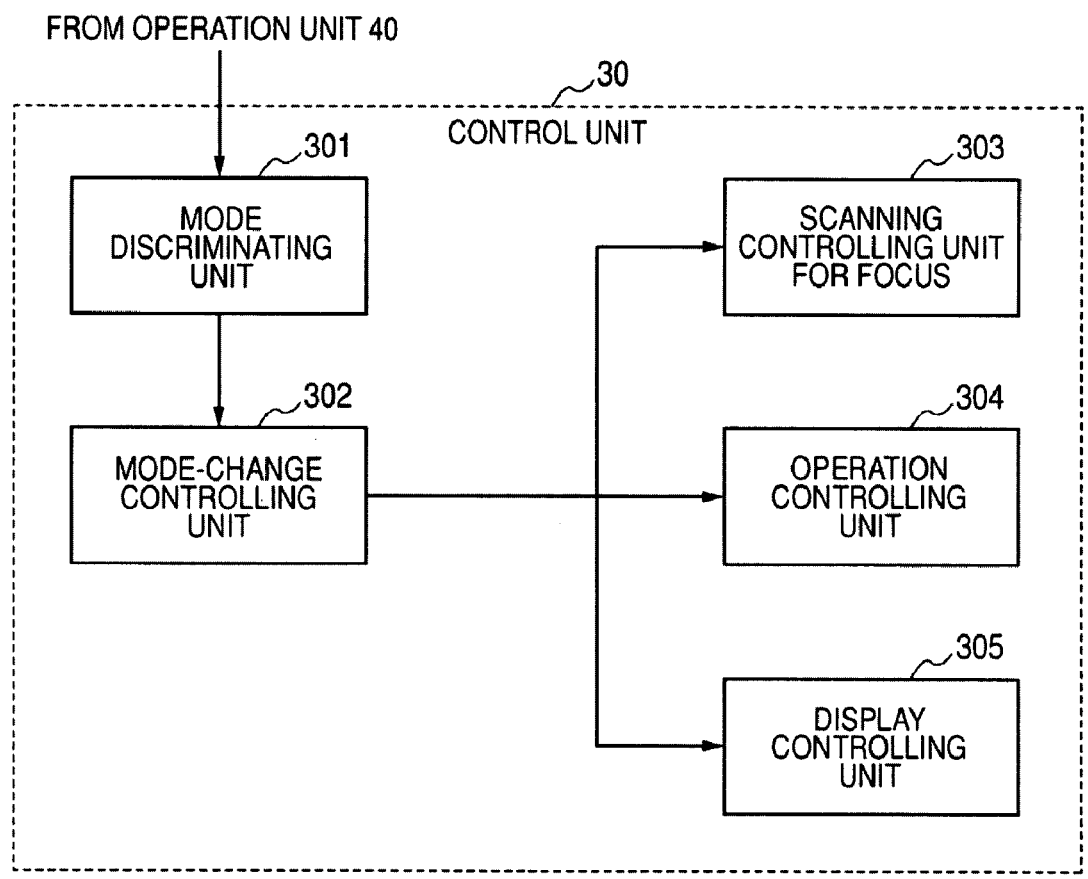
FIG. 8 is a block diagram for explaining functions realized by a controlling unit 30 of the imaging apparatus according to the embodiment.

In the imaging apparatus according to this embodiment, the switching of the imaging modes and the processing corresponding to the modes are realized by functions of the controlling unit 30. FIG. 8 is a block diagram for explaining the functions realized by the controlling unit 30 according to this embodiment. As shown In FIG. 8, the controlling unit 303 of the imaging apparatus according to this embodiment can realize functions of a mode discriminating unit 301, a mode-change controlling unit 302, a scanning controlling unit for focus 303, an operation controlling unit 304, and a display controlling unit 305.

In the controlling unit 30 of the imaging apparatus according to this embodiment, when selection input (switching instruction) for an imaging mode is received through the operation unit 40, the mode discriminating unit 301 discriminates whether an imaging mode selected by the user is the normal imaging mode or the simple imaging mode and notifies the mode-change controlling unit 302 of a result of the discrimination. The mode-change controlling unit 302 controls the scanning controlling unit for focus 303, the operation controlling unit 304, and the display controlling unit 305 according to the notified imaging mode.

When notification indicating that the normal imaging mode is selected is received from the mode discriminating unit 301, the mode-change controlling unit 302 controls the scanning controlling unit for focus 303 to allow the user to select the normal mode, the macro mode, and the auto macro mode. In this case, the mode-change controlling unit 302 controls the operation controlling unit 304 to allow the user to perform selection of modes, setting of parameters, and the like that are possible in the normal imaging mode. Further, the mode-change controlling unit 302 controls the display controlling unit 305 to display information concerning items and the like selectable in the normal imaging mode and various kinds of information that should be notified.

On the other hand, when notification indicating that the simple imaging mode is selected is received from the mode discriminating unit 301, the mode-change controlling unit 302 controls the scanning controlling unit for focus 303 to forcibly fix the imaging mode in the auto macro mode for setting the scanning area in an area from a position about 8 centimeters from the imaging apparatus to the infinity.

At the same time, the mode-change controlling unit 302 controls the operation controlling unit 304 to allow the user to perform only selection input for large and small of the image size, "automatic" and "light-emission prohibited" of the flash, and on and off of the self-timer that can be switched in the simple imaging mode. Further, the mode-change controlling unit 302 controls the display controlling unit 305 to display information concerning items that can be selected in the simple imaging mode and necessary minimum information that should be notified.

Consequently, a user accustomed to the operation of the imaging apparatus can relatively easily take an image by using the normal imaging mode. Further, the user can take an image in an intended form by performing switching to various modes that can be selected in the normal imaging mode, setting of parameters, and the like according to the intension of the user.

As explained above, a user unaccustomed to the operation of the imaging apparatus can perform selection input for large and small of the image size, "automatic" and "light-emission prohibited" of the flash, and on and off of the self-timer by using the simple imaging mode. Otherwise, the user can appropriately set focus and take an image of a target subject simply by depressing the shutter button regardless of whether the target subject is a near scene or a distant scene.

Therefore, even when plural users such as family members share the imaging apparatus according to this embodiment and degrees of proficiency of the users for the imaging apparatus are different, it is possible to allow the users to use the imaging apparatus in states most convenient for the users by switching the normal imaging mode and the simple imaging mode according to the users.

Figure 9:
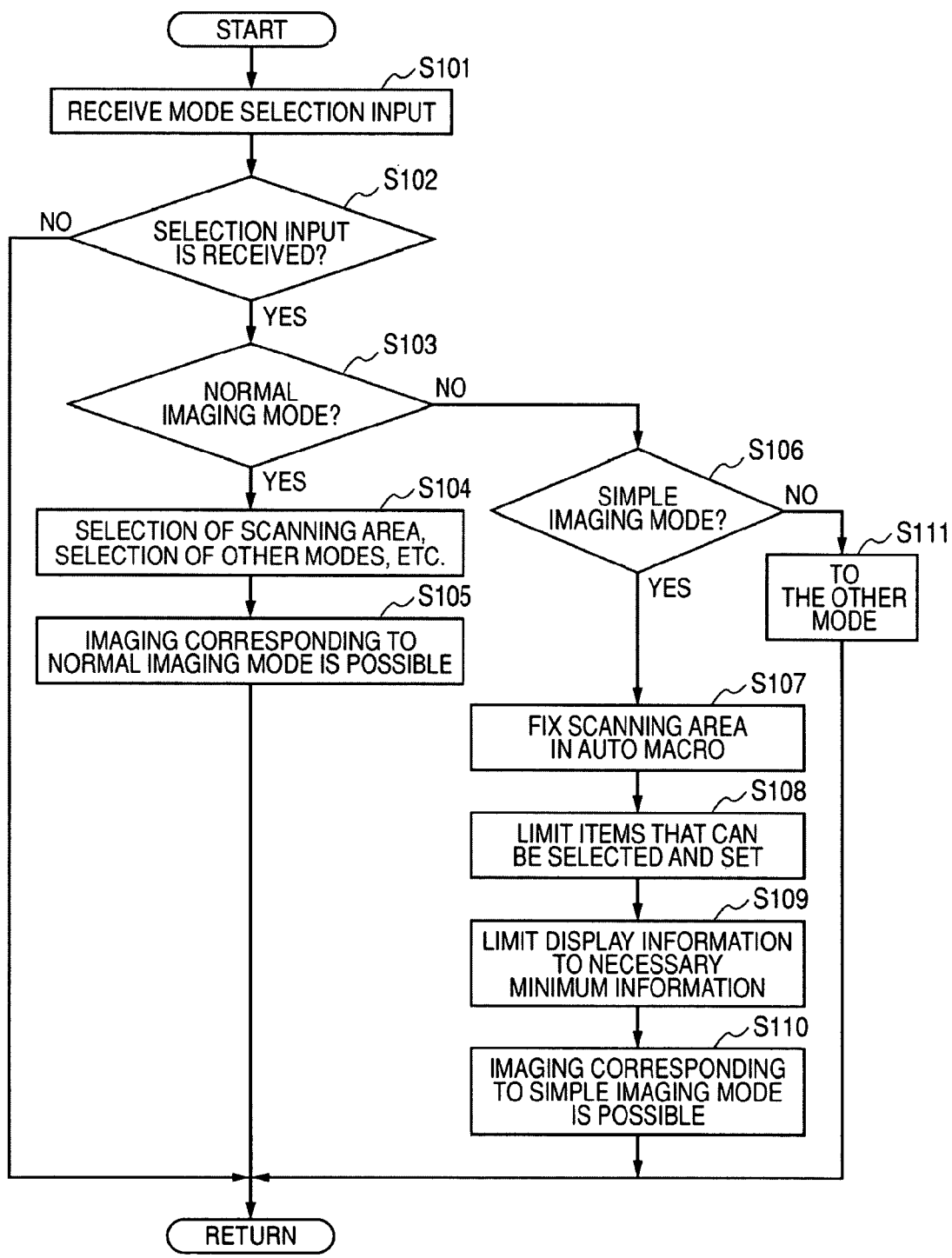
FIG. 9 is a flowchart for explaining processing for switching an imaging mode.

Summary of Processing Corresponding to the Imaging Mode in the Imaging Apparatus Switching of an imaging mode performed in the imaging apparatus according to this embodiment and processing corresponding to the switched imaging mode are summarized below. FIG. 9 is a flowchart for explaining processing for switching an imaging mode executed in the imaging apparatus according to this embodiment. The processing of the flowchart shown in FIG. 9 is executed at each predetermined timing in main processing executed by the con-rolling unit 30 of the imaging apparatus according to this embodiment.

When the processing shown in FIG. 9 is started, the controlling unit 30 receives selection input (switching input) for an imaging mode from the user through the operation unit 40 (step S101). The controlling unit 30 judges whether the selection input for an imaging mode is received in step S101 (step S102). When it is judged in the judging processing in step S102 that the selection input for an imaging mode is not received, the controlling unit 30 leaves the processing shown in FIG. 9 and returns to a main routine.

When it is judged in the judging processing in step S102 that the selection input for an imaging mode is received, the controlling unit 30 judges, using the function of the mode discriminating unit 301 realized by the controlling unit 30, whether the imaging mode selected by the user is the normal imaging mode (step S103).

When it is judged in the judging processing in step S103 that the normal imaging mode is selected by the user, the controlling unit 30 controls, using the function of the mode-change controlling unit 302 realized by the controlling unit 30, the scanning controlling unit for focus 303 also realized by the controlling unit 30 to allow the user to select a scanning area (select a scanning mode). Further, the controlling unit 30 controls the operation controlling unit 304 and the display controlling unit 305 also realized by the controlling unit 30 to allow the user to select and set various modes, parameters, and the like and displays necessary information on the display screen of the display system 19 to provide the user with the information (step S104).

After the processing in step S104, the imaging apparatus can perform imaging corresponding to the normal imaging mode (step S105). The controlling unit 30 leaves the processing shown in FIG. 9 and returns to the main routine.

When it is judged in the judging processing in step S103 that the imaging mode selected by the user is not the normal imaging mode, the controlling unit 30 judges, using the function of the mode discriminating unit 301 realized by the controlling unit 30, whether the selected imaging mode is the simple imaging mode (step S106).

When it is judged in the judging processing in step S106 that the simple imaging mode is selected, the controlling unit 30 controls, using the function of the mode-change controlling unit 302 realized by the controlling unit 30, the scanning controlling unit for focus 303 also realized by the controlling unit 30 to forcibly fix a scanning mode in the auto macro mode for scanning both the normal area and the macro area (step S107).

The mode-change controlling unit 302 realized by the controlling unit 30 controls the operation controlling unit 304 and the display controlling unit 305 also realized by the controlling unit 30 and limit items that can be selected and set (step S108). Further, the mode-change controlling unit 302 limits display information to necessary minimum information not to display unnecessary information (step S109). After the processing in step S109, the imaging apparatus can perform imaging corresponding to the simple imaging mode (step S110). The controlling unit 30 leaves the processing shown in FIG. 9 and returns to the main routine.

When it is judged in the judging processing in step S106 that the selected imaging mode is not the simple imaging mode, the mode-change controlling unit 302 realized by the controlling unit 30 controls the units to change the imaging mode to the simple imaging mode (step S111). The controlling unit 30 leaves the processing shown in FIG. 9 and returns to the main routine.

As explained above, the imaging apparatus according to this embodiment switches the normal imaging mode and the simple imaging mode to allow each user to perform imaging in an imaging mode suitable for the user. In particular, when an imaging mode is switched to the simple imaging mode, the user can appropriately take an image of a target subject simply by pointing the imaging apparatus at the target subject and depressing the shutter button without performing mode switching operation and various kinds of setting operation.

As explained above, the simple imaging mode of the imaging apparatus according to this embodiment allows a beginner and a user having difficulty in performing difficult setting operation to automatically set focus on a near scene or a distant scene at will without the necessity of knowledge about macro. This is realized by automatically activating an auto macro function when the simple imaging mode is set.

The simple imaging mode targets the beginner and the user having difficulty in performing difficult setting operation. The simple operation mode can be set by using menus, a mode dial, and the like. Kinds of setting operation that can be performed to set the simple imaging mode are fewer than those of the other imaging modes. When the simple imaging mode is used, displayed characters change to clear display such as displayed characters larger than those of the other imaging modes.

In the imaging apparatus according to this embodiment, the beginner and the user having difficulty in performing difficult setting operation can automatically set focus on a near scene and a distant scene at will without the necessity of knowledge and setting about macro and can appropriately take images of subjects in positions at various distances from the imaging apparatus.

It is possible to reduce steps for allowing an assumed user to perform imaging without being careful about an imaging distance by linking the simple imaging mode, which is setting for the assumed user, and the setting of the auto macro. In other words, when the simple imaging mode is used, it is unnecessary to perform operation for changing a scanning mode to the auto macro mode.

Modifications

In the explanation of the embodiment, the present invention is applied to the digital still camera. However, the present invention is not limited to this. It is possible to apply the present invention to various imaging apparatuses that have different scanning areas in the automatic focus adjusting function (the AF function) and can switch the normal mode, the macro mode, and the auto macro mode, for example, a camera module mounted on a mobile device such as a cellular phone terminal and a digital video camera.

In the embodiment explained above, the scanning mode of the automatic focus adjusting function is set in the auto macro mode, items that can be selected and set are limited, and information to be displayed is also limited to necessary minimum information. However, the present invention is not limited to this.

In order to allow the user to at least perform imaging with focus surely set on a target subject, when the simple imaging mode is selected, the scanning mode of the automatic focus adjusting function may be set in the auto macro mode. The functions in terms of operability and displayability do not have to be particularly taken into account. However, in terms of convenience for the user, it is desirable to limit operation items and limit display information to necessary minimum information taking into account at least one of operability and displayability or preferably both operability and displayability.

The present invention can be realized in various imaging apparatuses by applying the method explained with reference to FIG. 9 to the imaging apparatuses. It is possible to apply the present invention to various imaging apparatuses by creating a program matching the flowchart shown in FIG. 9 and allowing the imaging apparatuses to execute the program.

It is possible to apply the present invention to existing imaging apparatuses as well by recording the program matching the flowchart shown in FIG. 9 in various recording media and distributing the program or distributing the program through a high-frequency network such as the Internet such that the program can be additionally mounted on the existing imaging apparatuses. When the present invention is applied to the existing imaging apparatuses, it may be necessary to correct programs related to the existing imaging apparatuses.

It should be understood by those skilled in the art that various modifications, combinations, sub-combinations, and alterations may occur depending on design requirements and other factors insofar as they are within the scope of the appended claims or the equivalents thereof.

What is claimed is:

1. An imaging apparatus comprising:
   receiving means for receiving selection input for an imaging mode, the imaging mode comprising a normal imaging mode, and a simple imaging mode;
   discriminating means for determining the imaging mode that has been selected on the basis of the received selection input;
   receiving means for receiving selection input for an auto focus mode comprising a normal mode, a macro mode, and an automacro mode when the normal imaging mode is selected; and
   scanning controlling means for causing the imaging apparatus to execute scanning processing for determining a position of a subject to set focus on the subject, by scanning in a maximum range from a near scene to a distant scene when the simple imaging mode is selected.

2. The imaging apparatus according to claim 1, further comprising display controlling means for limiting display information to be displayed on a display device provided in the imaging apparatus and controlling a display form of the display information when the simple imaging mode is selected.

3. The imaging apparatus according to claim 1 or 2, further comprising operation controlling means for performing control to limit operable operation keys of the operation-input receiving means that receives operation input from the user when the simple imaging mode is selected.

4. The imaging apparatus according to claim 1, wherein the maximum range from a near scene to a distance scene is a range from a position 8 centimeters from the imaging apparatus to infinity.

5. A function control method comprising the steps of:
   receiving selection input for an imaging mode, the imaging mode comprising a normal imaging mode, and a simple imaging mode;
   determining the imaging mode that has been selected on the basis of the received selection input;
   receiving selection input for an auto focus mode comprising a normal mode, a macro mode, and an automacro mode, when the normal imaging mode is selected; and
   causing the imaging apparatus to set the auto focus mode to the automacro mode and execute scanning processing for determining a position of the subject to set focus on the subject, by scanning in a maximum range from a near scene to a distant scene when the simple imaging mode is selected.

6. A non-transitory computer readable medium storing a program causing a computer to execute the steps of:
   receiving selection input for an imaging mode, the imaging mode comprising a normal imaging mode, and a simple imaging mode;
   determining the imaging mode that has been selected on the basis of the received selection input;
   receiving selection input for an auto focus mode comprising a normal mode, a macro mode, and an automacro mode, when the normal imaging mode is selected; and
   causing the imaging apparatus to set the auto focus mode to the automacro mode and execute scanning processing for determining a position of the subject to set focus on the subject, by scanning in a maximum range from a near scene to a distant scene when the simple imaging mode is selected.

7. An imaging apparatus comprising:
   a receiving unit for receiving selection input for an imaging mode, the imaging mode comprising a normal imaging mode, and a simple imaging mode;
   a discriminating unit for determining the imaging mode that has been selected on the basis of the received selection input;
   receiving means for receiving selection input for an auto focus mode comprising a normal mode, a macro mode, and an automacro mode when the normal imaging mode is selected; and
   a scanning controlling unit for causing the imaging apparatus to execute scanning processing for determining a position of the subject to set focus on the subject, by scanning in a maximum range from a near scene to a distant scene when the simple imaging mode is selected.

8. The imaging apparatus of claim 7, wherein the normal imaging mode further comprises an exposure fixed mode.

9. The imaging apparatus of claim 8, wherein the normal imaging mode further comprises a white balance fixed mode.

10. The imaging apparatus of claim 9, wherein the normal imaging mode further comprises a shutter speed fixed mode.

11. The imaging apparatus of claim 10, wherein in the normal mode, the scanning controlling unit scans in a range from 50 centimeters from the imaging apparatus to infinity.

12. The imaging apparatus of claim 11, wherein in the macro mode, the scanning controlling unit scans in a range from 8 centimeters from the imaging apparatus to 50 centimeters from the imaging apparatus.

13. The imaging apparatus of claim 7, wherein when the simple imaging mode is selected, the auto focus mode is set to the automacro mode.

14. The imaging apparatus of claim 13, wherein when the simple imaging mode is selected, exposure is selected based on an automatic exposure adjusting function.

15. The imaging apparatus of claim 14, wherein when the simple imaging mode is selected, white balance is selected based on an automatic white balance adjusting function.

* * * * *